(12) United States Patent
Yamagishi et al.

(10) Patent No.: US 11,244,647 B2
(45) Date of Patent: Feb. 8, 2022

(54) IMAGE PROCESSING DEVICE, IMAGE PROCESSING METHOD, AND IMAGE DISPLAY SYSTEM

(71) Applicant: SOCIONEXT, INC., Kanagawa (JP)

(72) Inventors: Nobutaka Yamagishi, Yokohama (JP); Manuel Haj-Saleh, Munich (DE); Martin Maier, Munich (DE)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 16/943,878

(22) Filed: Jul. 30, 2020

(65) Prior Publication Data
US 2020/0357357 A1 Nov. 12, 2020

Related U.S. Application Data

(63) Continuation of application No. PCT/JP2018/004314, filed on Feb. 8, 2018.

(51) Int. Cl.
*G09G 5/00* (2006.01)

(52) U.S. Cl.
CPC ..... *G09G 5/003* (2013.01); *G09G 2340/0414* (2013.01); *G09G 2340/0421* (2013.01); *G09G 2340/0471* (2013.01)

(58) Field of Classification Search
CPC ............... G09G 5/003; G09G 5/391; G09G 2340/0414; G09G 2340/0421;
(Continued)

(56) References Cited

U.S. PATENT DOCUMENTS

| 6,118,413 A | 9/2000 | Bril et al. | |
|---|---|---|---|
| 2006/0170689 A1* | 8/2006 | Maier | B60K 35/00 345/501 |

(Continued)

FOREIGN PATENT DOCUMENTS

| JP | 2008-268701 A | 11/2008 |
|---|---|---|
| JP | 2013-213859 A | 10/2013 |
| WO | 2004/066139 A1 | 8/2004 |

OTHER PUBLICATIONS

International Search Report and Written Opinion issued in corresponding of International Patent Application. No. PCT/JP2018/004314, dated May 1, 2018, with partial translation.

(Continued)

*Primary Examiner* — Brent D Castiaux
(74) *Attorney, Agent, or Firm* — McDermott Will & Emery LLP

(57) ABSTRACT

An image processing device includes a memory that stores a program and a processor that executes the program stored in the memory to perform a process. The process includes obtaining input image data that is generated by combining, in a horizontal direction, an effective display area of first image data and an effective display area obtained by expanding an effective display area of second image data in the vertical direction, the vertical size of the second image data being smaller than the vertical size of the first image data; and generating second output image data corresponding to the second image data by reducing the vertical size of second intermediate image data among first intermediate image data and the second intermediate image data, which are obtained by dividing the input image data in the horizontal direction, based on the vertical size of the effective display area of the second image data.

19 Claims, 13 Drawing Sheets

(58) Field of Classification Search
CPC ....... G09G 2340/0471; G09G 2360/02; G09G 2360/04; G09G 2380/10; G06F 3/1431
See application file for complete search history.

(56) References Cited

U.S. PATENT DOCUMENTS

2010/0177017 A1* 7/2010 Zeng .................. G09G 5/006
  345/1.1
2014/0240330 A1* 8/2014 Mahe .................. G06F 3/1431
  345/520

OTHER PUBLICATIONS

Japanese Office Action issued in corresponding Japanese Patent Application No. 2019-570212, dated Nov. 2, 2021, with English translation.
Extended European Search Report issued in corresponding European Patent Application No. 18904695.6, dated Nov. 26, 2021.

* cited by examiner

IMAGE PROCESSING DEVICE, IMAGE PROCESSING METHOD, AND IMAGE DISPLAY SYSTEM

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/004314, filed on Feb. 8, 2018, the entire contents of which are incorporated herein by reference.

BACKGROUND OF THE INVENTION

1. Field of the Invention

The present invention relates to an image processing device, an image processing method, and an image display system.

2. Description of the Related Art

There is a known image display system where multiple image data sets with different image sizes are displayed on displays with the corresponding resolutions. For example, in an in-vehicle image display system, image data sets generated by an image generating device are displayed on a center information display and a multi-information display, respectively.

In such an image display system, a controller (an image processing device) is provided for each display, and image processing corresponding to the characteristics of the display is performed on image data. For this reason, as the number of displays increases, the number of controllers increases, which also increases costs and causes problems in, for example, an installation space and the amount of heat generation.

WO 2004/066139 and Japanese Unexamined Patent Application Publication No. 2013-213859, for example, disclose an image display system where multiple image data sets are combined by an image generating device into one image data set, and the one image data set is divided by a controller into multiple image data sets so that the image data sets are displayed at the same frame rate. With this image display system, the number of controllers can be reduced.

However, to display multiple image data sets, which are obtained by dividing one image data set and have different sizes, at the same frame rate as in the image display system disclosed in WO 2004/066139 and Japanese Unexamined Patent Application Publication No. 2013-213859, it is necessary to provide frame buffers in the controller. This is because it is necessary to temporarily store each frame of each image data set and output the frame at a pixel clock and a horizontal frequency corresponding to the resolution of a display.

Here, to further reduce costs, reduce an installation space, and reduce the amount of heat generation in an image display system, line buffers may be used in place of frame buffers. However, when line buffers are used, it is a prerequisite to match, for example, the horizontal frequencies of image data sets before and after the image data sets are stored in the line buffers.

Therefore, for example, when image data sets with different vertical sizes are combined and displayed at the same or substantially the same frame rate, the vertical blanking period becomes long with respect to the effective display area of one of the image data sets with a smaller size. In this case, the display standard requirements are not satisfied, and an image is not displayed normally.

SUMMARY OF THE INVENTION

In an aspect of this disclosure, there is provided an image processing device including a memory that stores a program and a processor that executes the program stored in the memory to perform a process. The process includes obtaining input image data that is generated by combining, in a horizontal direction, an effective display area of first image data and an effective display area obtained by expanding an effective display area of second image data in the vertical direction, the vertical size of the second image data being smaller than the vertical size of the first image data; and generating second output image data corresponding to the second image data by reducing the vertical size of second intermediate image data among first intermediate image data and the second intermediate image data, which are obtained by dividing the input image data in the horizontal direction, based on the vertical size of the effective display area of the second image data.

DESCRIPTION OF THE PREFERRED EMBODIMENTS

An aspect of this disclosure makes it possible to reduce a blanking period in an image display system where image data sets obtained by dividing one image data set and having different sizes are displayed at the same or substantially the same frame rate on multiple displays with different sizes.

Embodiments of the present invention are described below with reference to the accompanying drawings. In the specification and the drawings, the same reference number is assigned to components having substantially the same functional configuration, and repeated descriptions of those components are omitted.

First Embodiment

<System Configuration of in-Vehicle Image Display System>

Figure 1:
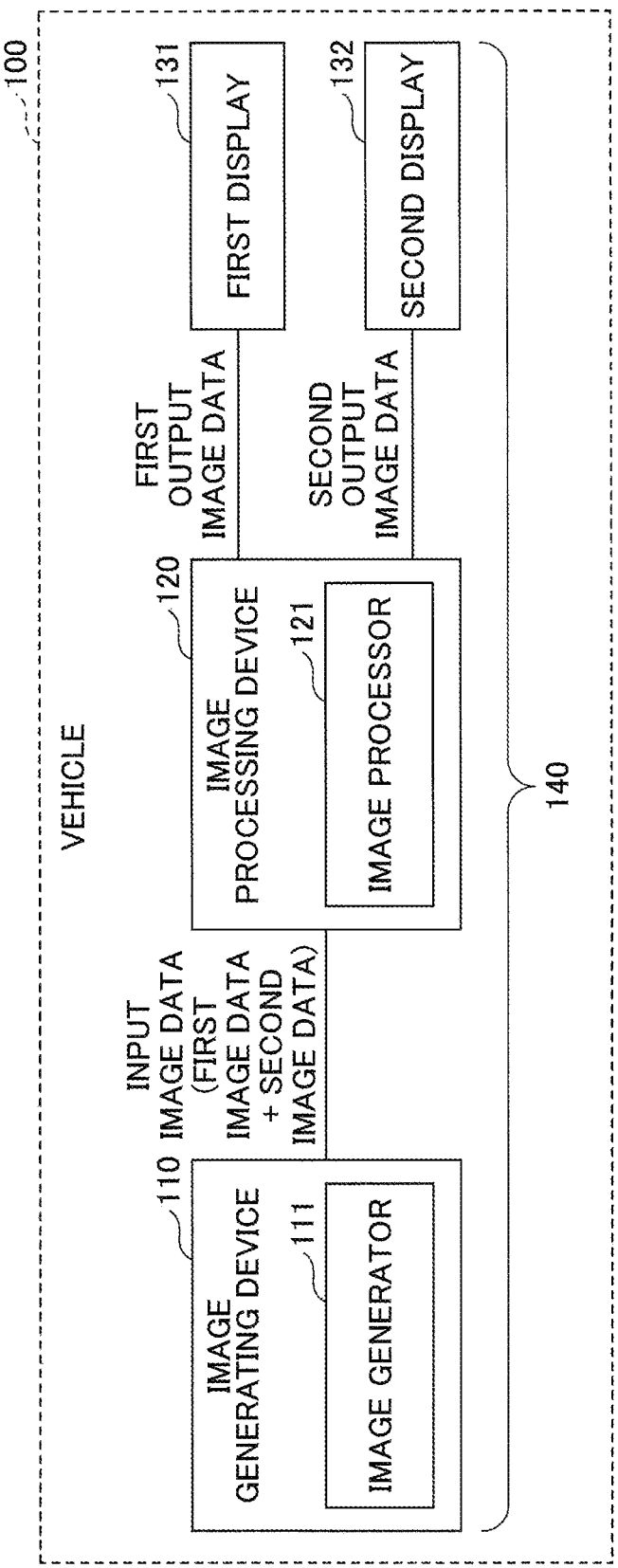
FIG. 1 is a drawing illustrating an example of a system configuration of an in-vehicle image display system.

First, a system configuration of an in-vehicle image display system is described. FIG. 1 is a drawing illustrating an example of a system configuration of an in-vehicle image display system.

As illustrated in FIG. 1, an image display system 140 installed in a vehicle 100 includes an image generating device 110, an image processing device 120, a first display 131, and a second display 132.

The image generating device 110 is, for example, a navigation device or a head unit in an in-vehicle system, and includes an image generator 111 (generating unit). The image generator 111 generates input image data based on first image data for the first display 131 and second image data for the second display 132, and outputs the input image data to the image processing device 120.

For example, a semiconductor chip for executing image processing is provided in the image processing device 120, and the image processing device 120 functions as an image processor 121 implemented by operations of the semiconductor chip.

The image processor 121 obtains the input image data from the image generating device 110 and divides the input image data in a horizontal direction to generate first intermediate image data and second intermediate image data.

Also, the image processor 121 generates first output image data and second output image data by reducing the vertical size of one or both of the first intermediate image data and the second intermediate image data. Further, the image processor 121 outputs the first output image data to the first display 131 and outputs the second output image data to the second display 132.

The first display 131 displays the first output image data output from the image processor 121. The first display 131 is assumed to have a resolution of, for example, 1920 pixels×1080 pixels.

The second display 132 displays the second output image data output from the image processor 121. The second display 132 is assumed to have a resolution of, for example, 1280 pixels×720 pixels.

<Example of Layout of Multiple Displays>

Figure 2:
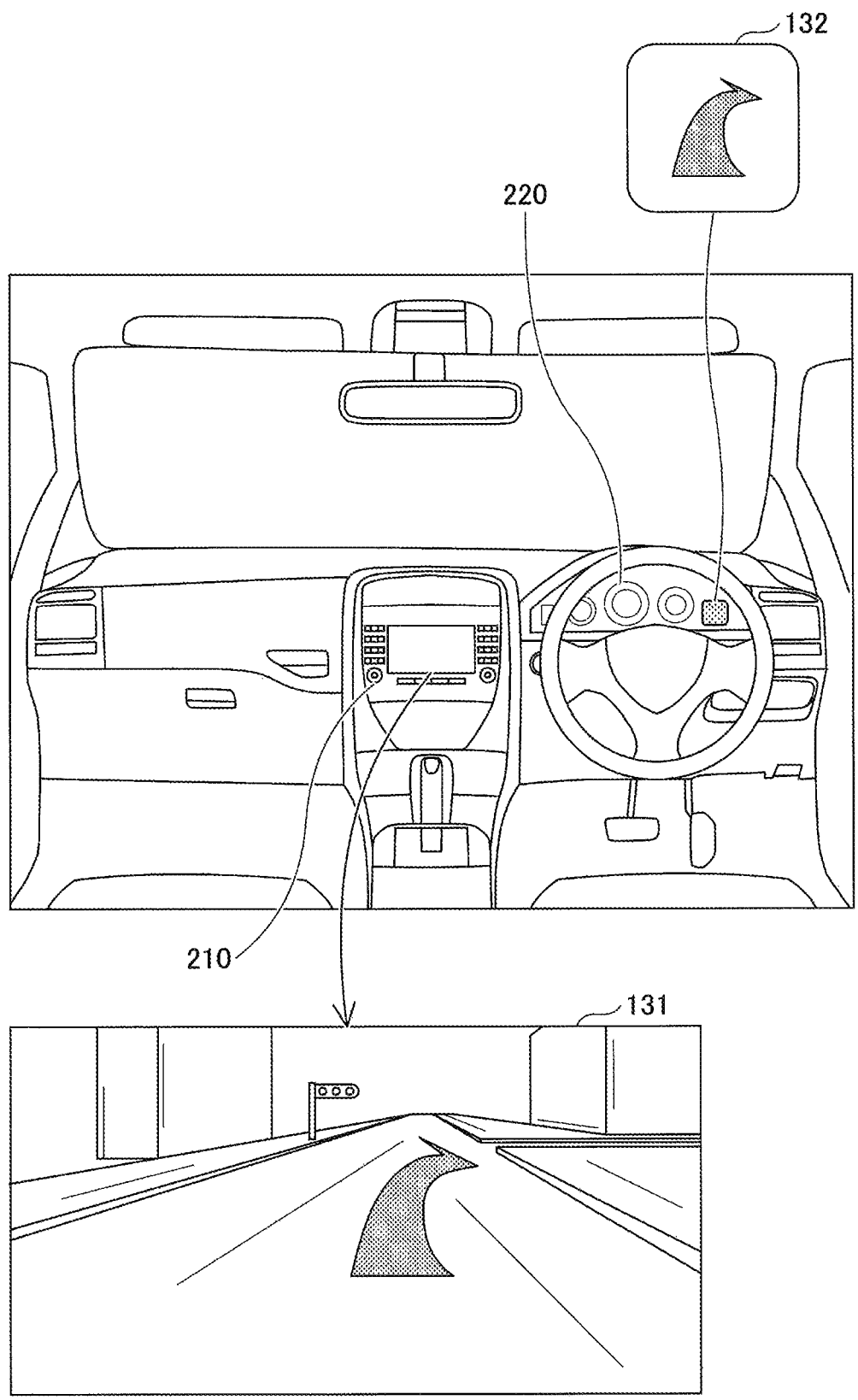
FIG. 2 is a drawing illustrating an example of a layout of displays.

Next, an example of a layout of the first and second displays 131 and 132 constituting the image display system 140 installed in the vehicle 100 is described. FIG. 2 is a drawing illustrating an example of a layout of displays. As illustrated in FIG. 2, the first display 131 is disposed in a center console 210 of the vehicle 100 and functions as a center information display. The second display 132 is disposed in a meter panel 220 of the vehicle 100 and functions as a multi-information display.

<Hardware Configuration of Image Processing Device>

Figure 3:
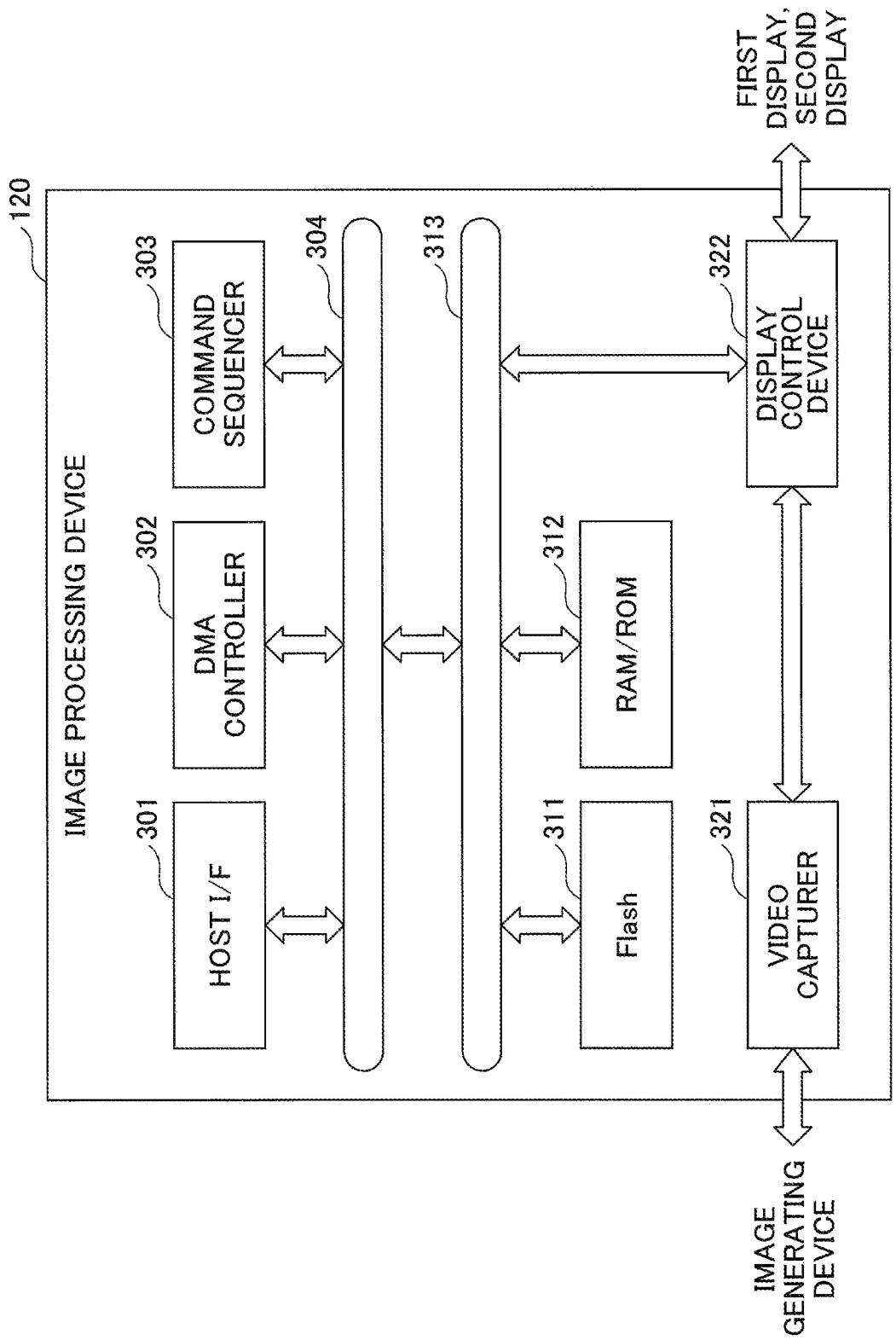
FIG. 3 is a drawing illustrating an example of a hardware configuration of an image processing device.

Next, a hardware configuration of the image processing device 120 is described. FIG. 3 is a drawing illustrating an example of a hardware configuration of an image processing device. As illustrated in FIG. 3, the image processing device 120 includes a host I/F 301, a DMA controller 302, and a command sequencer 303. These hardware components are connected to each other via a first bus 304.

Also, the image processing device 120 includes a flash 311 and a RAM/ROM 312. These hardware components are connected to each other via a second bus 313. The first bus 304 and the second bus 313 are connected to each other via a bridge.

Further, the image processing device 120 includes a video capturer 321 and a display control device 322, and the display control device 322 is connected to the second bus 313.

The host I/F (interface) 301 is connected to an external device (not shown) and receives setting data transmitted from the external device.

The DMA (direct memory access) controller 302 performs a control to store the setting data received by the host I/F 301 in the flash 311. The command sequencer 303 controls the entire image processing device 120. The flash (flash memory) 311 stores the setting data received by the host I/F 301. The RAM/ROM 312 functions as a main storage used by the command sequencer 303 to control the entire image processing device 120.

The video capturer 321 sequentially obtains the input image data output from the image generating device 110 in units of multiple lines and outputs the input image data to the display control device 322. The display control device 322 performs image processing according to the setting data. The image processing device 120 functions as the image processor 121 implemented by operations of the display control device 322. With the above configuration, the image processing device 120 can obtain the input image data from the image generating device 110 and output the first output image data and the second output image data to the first display 131 and the second display 132.

<Details of Processes Performed by Devices>

Next, details of processes performed by devices (here, the image generating device and the image processing device) in the image display system 140 are described. Below, details of processes performed by devices in an image display system of a comparative example are first described, and then details of processes performed by devices in the image display system 140 of the first embodiment are described.

(1) Details of Processes Performed by Devices in Image Display System

Figure 4:
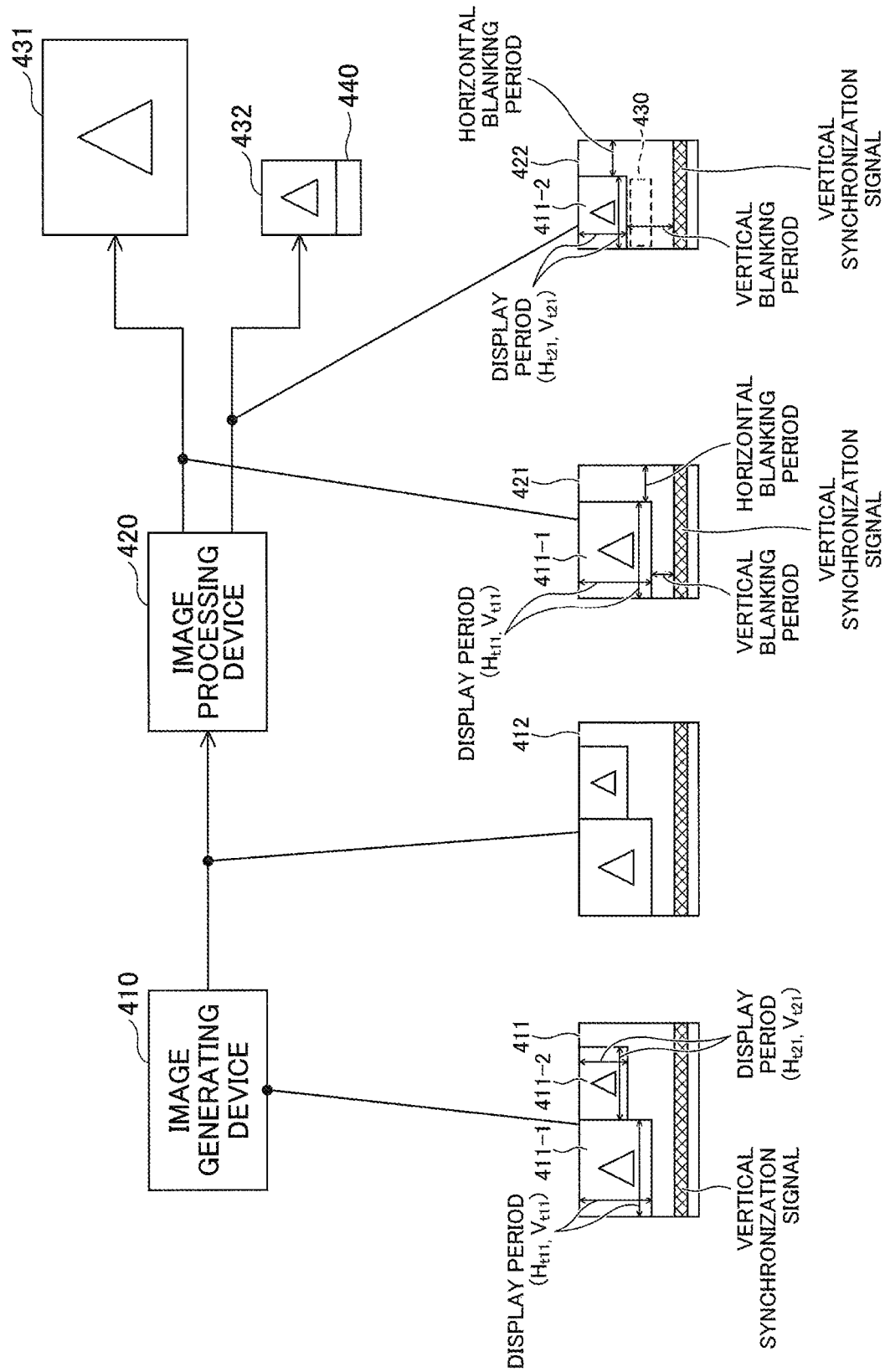
FIG. 4 is a drawing illustrating details of processes performed by devices in an image display system according to a comparative example.

FIG. 4 is a drawing illustrating details of processes performed by devices in an image display system according to a comparative example. Here, as illustrated in FIG. 4, the image display system is assumed to have a configuration described below.

The image display system includes an image generating device 410, an image processing device 420, a first display 431, and a second display 432.

The image generating device 410 generates image data 411 based on image data (1920 pixels×1080 pixels) for the first display 431 and image data (1280 pixels×720 pixels) for the second display 432. Also, the image generating device 410 outputs the generated image data 411 as input image data 412 to the image processing device 420.

The image processing device 420 divides the input image data 412 in a horizontal direction to generate first output image data 421 and second output image data 422.

The image processing device 420 does not include frame buffers, but instead includes line buffers.

The first display 431 has a resolution of 1920 pixels×1080 pixels, and the second display 432 has a resolution of 1280 pixels×720 pixels.

The vertical frequency (refresh rate) of the input image data 412 is equal to the vertical frequency of the first output image data 421. Also, the vertical frequency of the input image data 412 is also equal to the vertical frequency of the second output image data 422.

The horizontal frequency of the input image data 412 is equal to the horizontal frequency of the first output image data 421. The horizontal frequency of the input image data 412 is also equal to the horizontal frequency of the second output image data 422.

In this image display system, the devices perform processes described below.

First, the image generating device 410 generates the image data 411 by combining an effective display area 411-1 of the image data for the first display 431 and an effective display area 411-2 of the image data for the second display 432 in the horizontal direction. For example, the effective display area 411-1 is 1920 pixels×1080 pixels, and the effective display area 411-2 is 1280 pixels×720 pixels.

Next, the image generating device 410 outputs the generated image data 411 as the input image data 412 to the image processing device 420. As a result, the image processing device 420 obtains the input image data 412.

The image processing device 420 divides the input image data 412 in the horizontal direction to generate the first output image data 421 and the second output image data 422.

In the first output image data 421, a horizontal blanking period and a horizontal synchronization signal are set according to the resolution of the first display 431. Here, because the image processing device 420 does not include frame buffers, the first output image data 421 is synchronized such that its vertical frequency becomes equal to the vertical frequency of the input image data 412. Therefore, the vertical blanking period of the first output image data 421 is set based on the vertical blanking period of the input image data 412, and the corresponding vertical synchronization signal is set. The vertical blanking period of the first output image data 421 is preferably the same as the vertical blanking period of the input image data 412. However, a difference of, for example, several lines is acceptable as long as it is not noticeable on the display screen.

Accordingly, the effective display area 411-1 is displayed on the first display 431 at the same frame rate as the input image data 412.

On the other hand, in the second output image data 422, a horizontal blanking period and a horizontal synchronization signal are set according to the resolution of the second display 432. Also, because the image processing device 420 does not include frame buffers, the second output image data 422 is synchronized such that its vertical frequency becomes equal to the vertical frequency of the input image data 412. Therefore, the vertical blanking period of the second output image data 422 is set based on the vertical blanking period of the input image data 412, and the corresponding vertical synchronization signal is set. The vertical blanking period of the second output image data 422 is preferably the same as the vertical blanking period of the input image data 412. However, a difference of, for example, several lines is acceptable as long as it is not noticeable on the display screen.

Here, the vertical size of the effective display area 411-2 included in the second output image data 422 is smaller than the vertical size of the effective display area 411-1 included in the first output image data 421. Therefore, when the vertical blanking period is set in the second output image data 422 such that its vertical frequency becomes equal to the vertical frequency of the input image data 412, the blanking period becomes longer (i.e., the vertical blanking period becomes longer by a period corresponding to an area indicated by a dotted line 430 in FIG. 4).

Such an image with a long vertical blanking period does not satisfy the display standard requirements and as a result, the effective display area 411-2 cannot be properly displayed on the second display 432.

As illustrated in FIG. 4, when comparing the image data 411 and the first output image data 421,
in the horizontal direction, the display period of the effective display area 411-1 remains unchanged at $H_{t11}$; and
in the vertical direction, the display period of the effective display area 411-1 remains unchanged at $V_{t11}$.

Also, as illustrated in FIG. 4, when comparing the image data 411 and the second output image data 422,
in the horizontal direction, the display period of the effective display area 411-2 remains unchanged at $H_{t21}$; and
in the vertical direction, the display period of the effective display area 411-2 remains unchanged at $V_{t21}$.

(2) Details of Processes Performed by Devices in Image Display System of First Embodiment (2-1 Details of Processes Performed by Devices)

Figure 5:
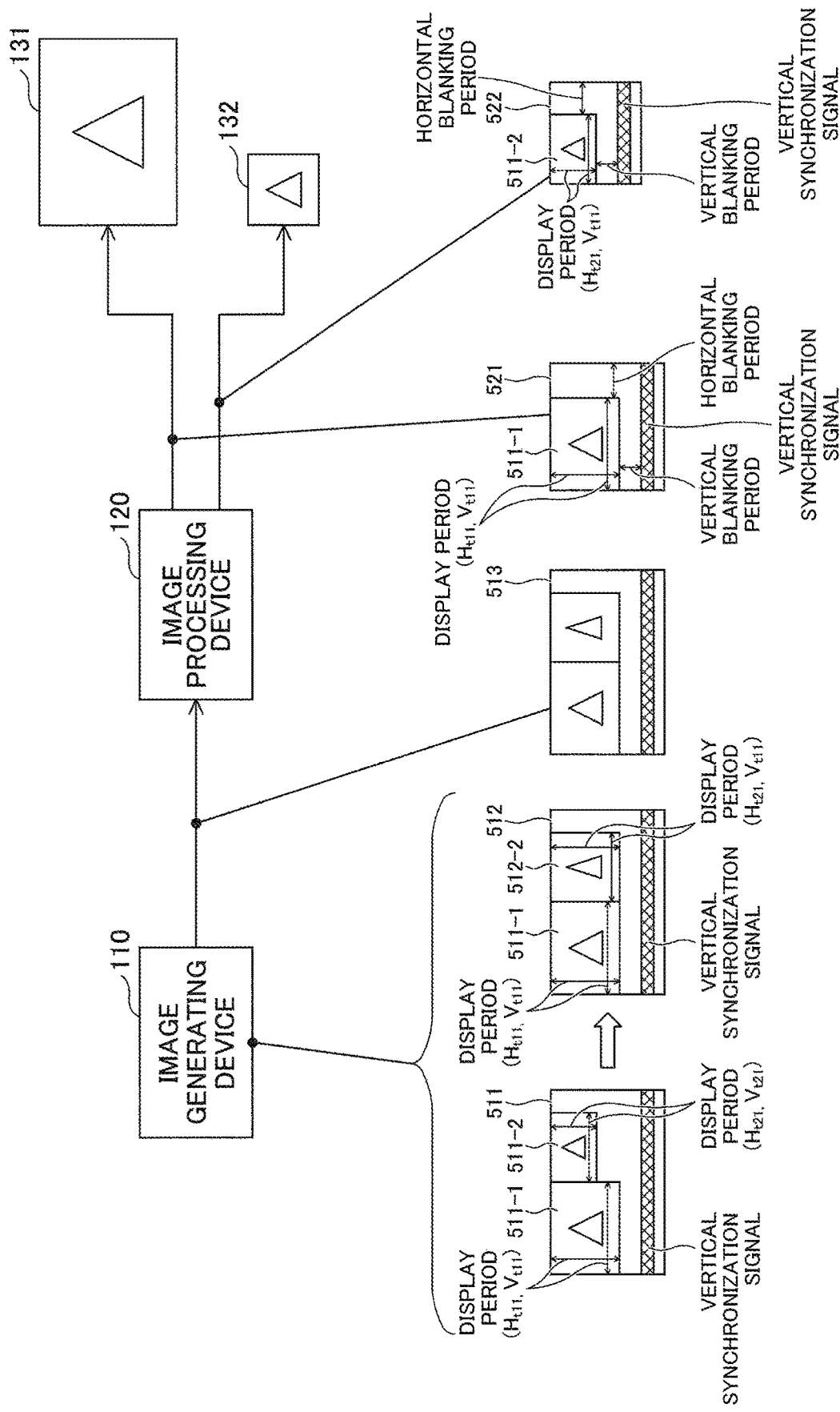
FIG. 5 is a drawing illustrating details of processes performed by devices in an image display system according to a first embodiment.

Next, details of processes performed by the devices in the image display system 140 of the first embodiment are described. FIG. 5 is a drawing illustrating details of processes performed by devices in the image display system of the first embodiment.

The image generating device 110 generates image data 511 by combining an effective display area 511-1 of first image data for the first display 131 having a resolution of 1920 pixels×1080 pixels and an effective display area 511-2 of second image data for the second display 132 having a resolution of 1280 pixels×720 pixels in the horizontal direction. The effective display area 511-1 is 1920 pixels×1080 pixels, and the effective display area 511-2 is 1280 pixels× 720 pixels.

Also, the image generating device 110 calculates the ratio of the vertical size of the effective display area 511-1 of the first image data for the first display 131 to the vertical size of the effective display area 511-2 of the second image data for the second display 132. Further, the image generating device 110 expands the size of the effective display area 511-2 of the second image data for the second display 132 in the vertical direction by a filtering process based on the calculated ratio. As a result, the image generating device 110 obtains an effective display area 512-2.

Next, the image generating device 110 generates image data 512 by combining the effective display area 511-1 of the first image data for the first display 131 and the effective display area 512-2 of the second image data for the second display 132 in the horizontal direction.

Next, the image generating device 110 outputs the generated image data 512 as input image data 513 to the image processing device 120. As a result, the image processing device 120 obtains the input image data 513.

The image processing device 120 generates first output image data 521 and second output image data 522 by dividing the input image data 513 in the horizontal direction.

In the first output image data 521, a horizontal blanking period and a horizontal synchronization signal are set according to the resolution of the first display 131. Here, because the image processing device 120 does not include frame buffers, the first output image data 521 is synchronized such that its vertical frequency becomes equal to the vertical frequency of the input image data 513.

Therefore, the vertical blanking period of the first output image data 521 is set based on the vertical blanking period of the input image data 513, and the corresponding vertical synchronization signal is set. The vertical blanking period of the first output image data 521 is preferably the same as the vertical blanking period of the input image data 513. However, a difference of, for example, several lines is acceptable as long as it is not noticeable on the display screen.

Accordingly, the effective display area 511-1 is displayed on the first display 131 at the same frame rate as the input image data 513.

On the other hand, in generating the second output image data 522, the image processing device 120 generates the effective display area 511-2 by reducing the size of the effective display area 512-2 included in the input image data 513 in the vertical direction by a filtering process. Here, when the vertical size of the effective display area 512-2 after the division is reduced in the vertical direction, the number of lines output in the same period in the vertical direction is reduced.

Although the effective display area 511-1 of the first output image data 521 and the effective display area 511-2 of the second output image data 522 have different vertical sizes, their vertical frequencies can be made equal to each other by adjusting the pixel clock for the second output image data 522.

Therefore, when the vertical blanking period is set in the second output image data 522 such that its vertical frequency becomes equal to the vertical frequency of the input image data 513, the vertical blanking period can be made shorter than the vertical blanking period set in the second output image data 422 illustrated in FIG. 4.

As a result, the image processing device 120 can display the effective display area 511-2 on the second display 132 at the same frame rate as the input image data 513.

As illustrated in FIG. 5, when comparing the image data 512 and the first output image data 521,
   in the horizontal direction, the display period of the effective display area 511-1 remains unchanged at $H_{t11}$; and
   in the vertical direction, the display period of the effective display area 511-1 remains unchanged at $V_{t11}$.

Also, as illustrated in FIG. 5, when comparing the display period of the effective display area 512-2 of the image data 512 and the display period of the effective display area 511-2 of the second output image data 522,
   in the horizontal direction, the display period remains unchanged at $H_{t21}$; and
   in the vertical direction, the display period remains unchanged at $V_{t11}$.

(2-2 Functional Configuration of Image Processor)

Figure 6:
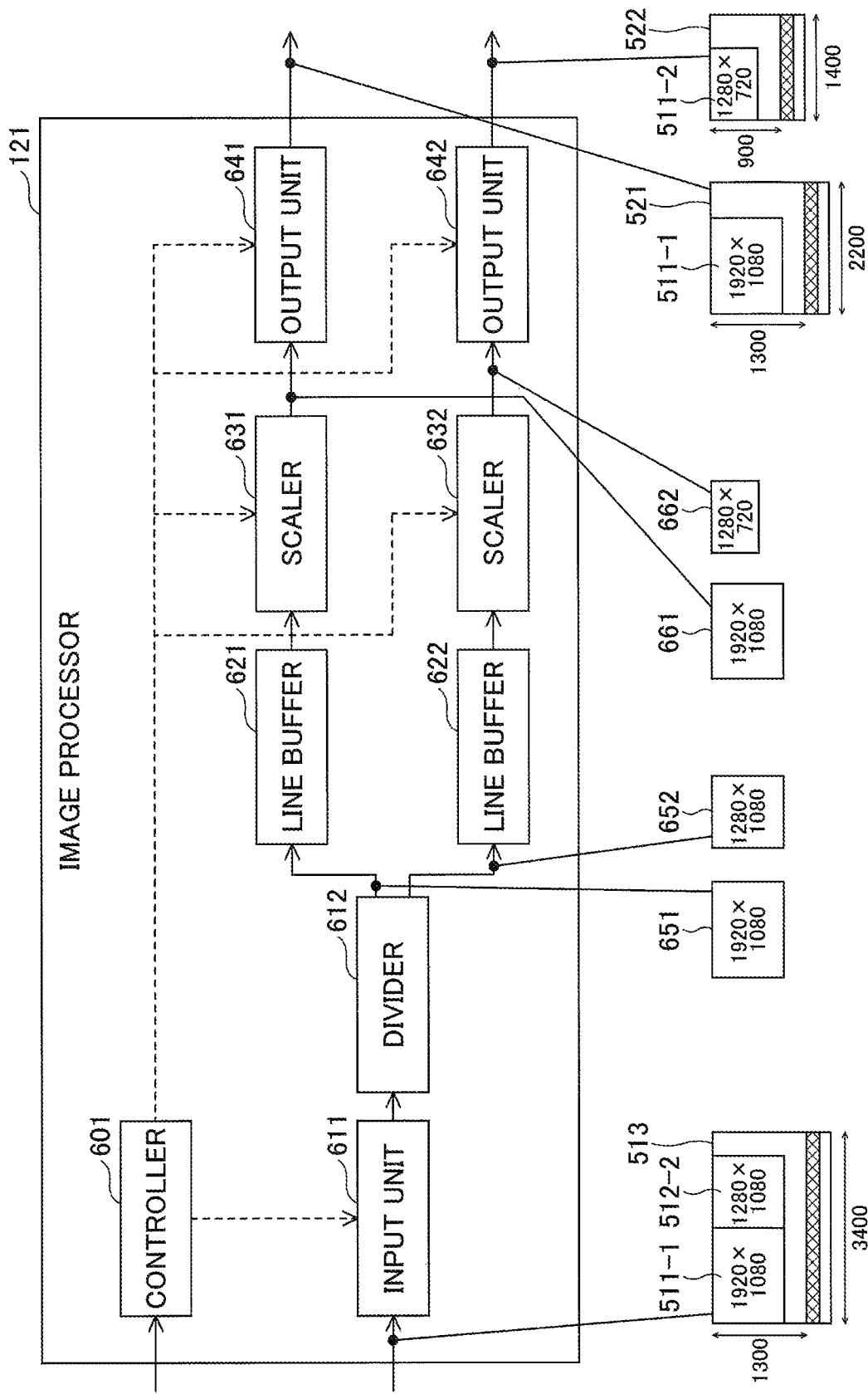
FIG. 6 is a drawing illustrating an example of a functional configuration of an image processor of an image processing device according to the first embodiment.

Next, a functional configuration of the image processor 121 is described. FIG. 6 is a drawing illustrating an example of a functional configuration of an image processor of the image processing device of the first embodiment. In the case of the image processing device 120 of the first embodiment, as illustrated in FIG. 6, the image processor 121 includes a controller 601 (control unit and storage unit), an input unit 611 (acquisition unit), a divider 612 (dividing unit), and line buffers 621 and 622. Also, the image processor 121 includes scalers 631 and 632 and output units 641 and 642 (which may be referred to as "image processing unit"). These functional components of the image processor 121 may be implemented by a processor (e.g., a CPU) that executes a program stored in a memory (e.g., a RAM) to perform processes corresponding to the functions of the functional components. Similarly, the image generator 111 of the image generating device 110 may be implemented by a processor (e.g., a CPU) that executes a program stored in a memory (e.g., a RAM) to perform a process corresponding to the function of the image generator 111.

The controller 601 receives setting data from an external device (not shown) and stores the setting data. Also, the controller 601 reports the stored setting data to the input unit 611, the scalers 631 and 632, and the output units 641 and 642. For example, the setting data received by the controller 601 includes:
   the size (1920 pixels×1080 pixels) of the effective display area 511-1,
   the size (1280 pixels×720 pixels) of the effective display area 511-2, and
   the expansion ratio (1080 pixels/720 pixels) of the effective display area 512-2 in the vertical direction.

The input unit 611 sequentially obtains the input image data 513 (for example, 3400 pixels×1300 pixels) from the image generating device 110 at a predetermined pixel clock in units of multiple lines, and outputs the input image data 513 to the divider 612.

The divider 612 divides the input image data 513 output from the input unit 611 in the horizontal direction according to display area sizes identified based on the setting data (divides the input image data 513 in the horizontal direction at a position between the effective display area 511-1 and the effective display area 512-2). Also, the divider 612 generates first intermediate image data 651 and second intermediate image data 652 by the division, and outputs the first intermediate image data 651 and the second intermediate image data 652 to the line buffers 621 and 622, respectively.

The line buffers 621 and 622, respectively, store the first intermediate image data 651 and the second intermediate image data 652 output from the divider 612 in units of multiple lines.

The scalers 631 and 632 read the first intermediate image data 651 and the second intermediate image data 652 stored in the line buffers 621 and 622, and perform filtering processes.

In the first embodiment, the image generating device 110 does not expand the effective display area 511-1 when generating the input image data 513. Therefore, the scaler 631 outputs the first intermediate image data 651 read from the line buffer 621 to the output unit 641 as first intermediate image data 661 without reducing its size by the filtering process.

On the other hand, in the first embodiment, when generating the input image data 513, the image generating device 110 expands the effective display area 511-2 by a filtering process to obtain the effective display area 512-2. Therefore, the scaler 632 outputs the second intermediate image data 652 as second intermediate image data 662 to the output unit 642 after performing a filtering process to reduce its size by an amount expanded in the vertical direction by the image generating device 110 through the filtering process. Thus, the scaler 632 can reproduce image data equivalent to the second image data for the second display 132 that is initially generated by the image generating device 110.

The output unit 641 generates the first output image data 521 (which has the same horizontal frequency and the same vertical frequency as the input image data 513) based on the first intermediate image data 661 output from the scaler 631. The output unit 641 outputs the generated first output image data 521 to the first display 131. As a result, the first display 131 can display the effective display area 511-1 suitable for its resolution (for example, 1920 pixels×1080 pixels) at the same frame rate as the input image data 513.

On the other hand, the output unit 642 generates the second output image data 522 (which has a lower horizontal frequency than and the same vertical frequency as the input image data 513) based on the second intermediate image data 662 output from the scaler 632. The output unit 642 outputs the generated second output image data 522 to the second display 132. As a result, the second display 132 can display the effective display area 511-2 suitable for its resolution (for example, 1280 pixels×720 pixels) at the same frame rate as the input image data 513 without including a non-display area.

(2-3 Image Processing by Image Processing Device)

Figure 7:
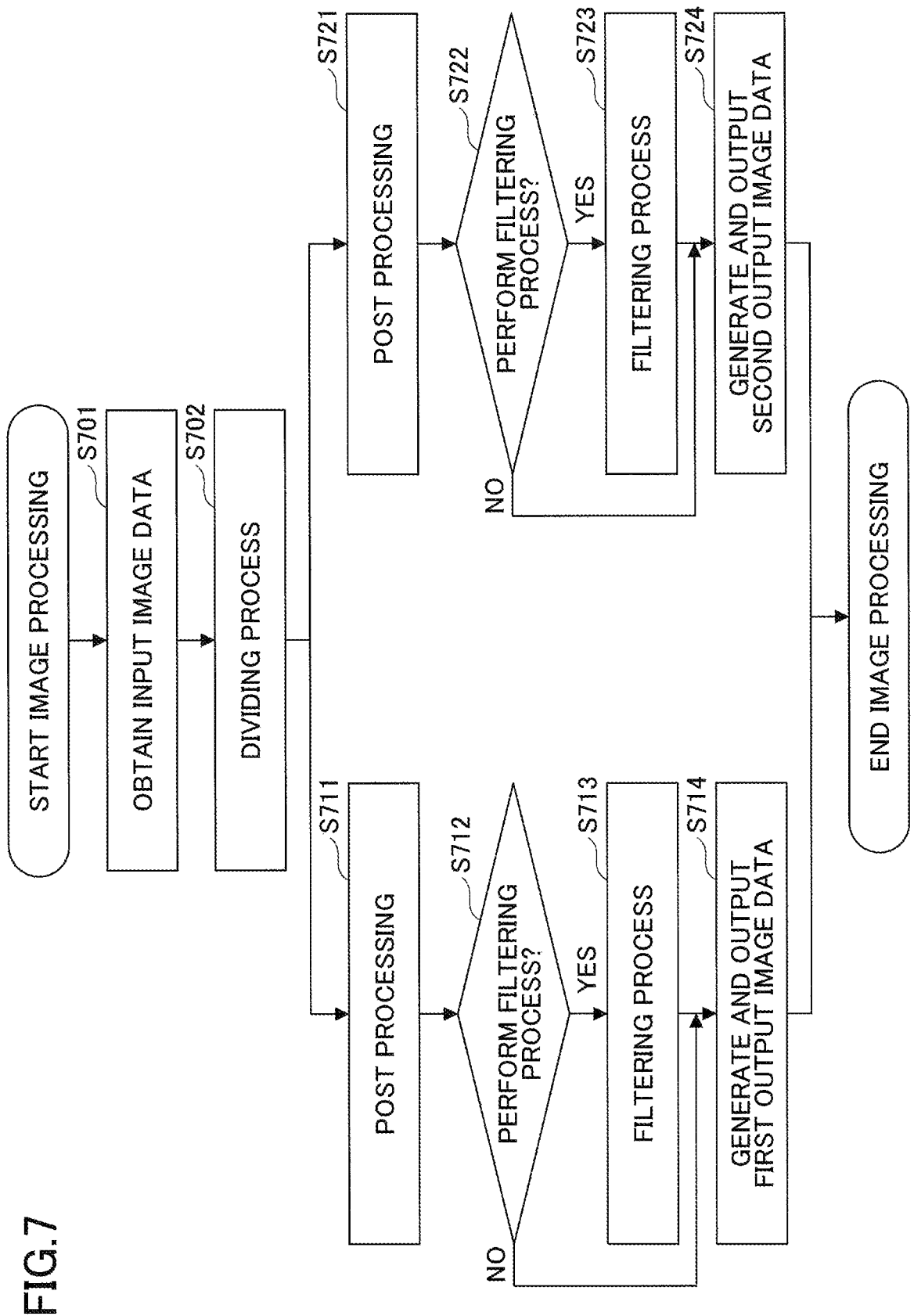
FIG. 7 is a flowchart illustrating image processing performed by the image processor of the image processing device according to the first embodiment.

Next, image processing performed by the image processor 121 of the image processing device 120 is described. FIG. 7 is a flowchart illustrating image processing performed by the image processor of the image processing device according to the first embodiment.

At step S701, the input unit 611 sequentially obtains the input image data 513 from the image generating device 110 in units of multiple lines.

At step S702, the divider 612 divides the input image data 513 in the horizontal direction to generate the first intermediate image data 651 and the second intermediate image data 652.

At step S711, the divider 612 performs post processing such as gamma correction on the generated first intermediate image data 651, and stores the first intermediate image data 651 in the line buffer 621 in units of multiple lines.

At step S712, the scaler 631 determines whether to perform a filtering process based on the setting data reported from the controller 601. When it is determined at step S712 that the filtering process is not performed (NO at step S712), the process proceeds to step S714.

On the other hand, when it is determined at step S712 that the filtering process is performed (YES at step S712), the process proceeds to step S713. At step S713, the scaler 631 performs the filtering process on the first intermediate image data 651.

At step S714, the output unit 641 generates the first output image data 521 based on the first intermediate image data 661 output from the scaler 631, and outputs the first output image data 521 to the first display 131.

On the other hand, at step S721, the divider 612 performs post processing such as gamma correction on the generated second intermediate image data 652, and stores the second intermediate image data 652 in the line buffer 622 in units of multiple lines.

At step S722, the scaler 632 determines whether to perform a filtering process based on the setting data reported from the controller 601. When it is determined at step S722 that the filtering process is not performed (NO at step S722), the process proceeds to step S724.

On the other hand, when it is determined at step S722 that the filtering process is performed (YES at step S722), the process proceeds to step S723. At step S723, the scaler 632 performs the filtering process on the second intermediate image data 652.

At step S724, the output unit 642 generates the second output image data 522 based on the second intermediate image data 662 output from the scaler 632, and outputs the second output image data 522 to the second display 132.

SUMMARY

As is clear from the above descriptions, the following processes are performed in the image display system of the first embodiment.

The image generating device generates an effective display area (1920 pixels×1080 pixels) of first image data for a first display. Also, the image generating device generates an effective display area (1280 pixels×1080 pixels) by expanding the size of an effective display area (1280 pixels×720 pixels) of second image data for a second display in the vertical direction. Further, the image generating device generates input image data by combining the generated effective display area (1920 pixels×1080 pixels) and the generated effective display area (1280 pixels×1080 pixels) in the horizontal direction, and outputs the input image data to the image processing device.

The image processing device obtains the input image data output from the image generating device.

The image processing device generates first intermediate image data and second intermediate image data by dividing the obtained input image data in the horizontal direction. Also, the image processing device performs a filtering process on the second intermediate image data to reduce the vertical size of the second intermediate image data and thereby generate second output image data.

With this configuration, the image display system of the first embodiment can output the second output image data at a horizontal frequency lower than that of the input image data even when line buffers are used instead of frame buffers. This in turn makes it possible to reduce the vertical blanking period in the second output image data having the same vertical frequency as the input image data.

That is, the image display system of the first embodiment can reduce the blanking period when displaying sets of intermediate image data, which are obtained by dividing input image data and have different sizes, at the same frame rate. This in turn makes it possible to display sets of output image data at the same frame rate as input image data without including a non-display area.

Second Embodiment

In the configuration of the first embodiment, the scaler performs a filtering process to reduce the number of lines of an effective display area. On the other hand, in a second embodiment, the scaler performs a thinning process to reduce the number of lines of an effective display area. Below, differences between the second embodiment and the first embodiment are mainly described.

<Details of Processes Performed by Devices in Image Display System of Second Embodiment>

(1) Details of Processes Performed by Devices

Figure 8:
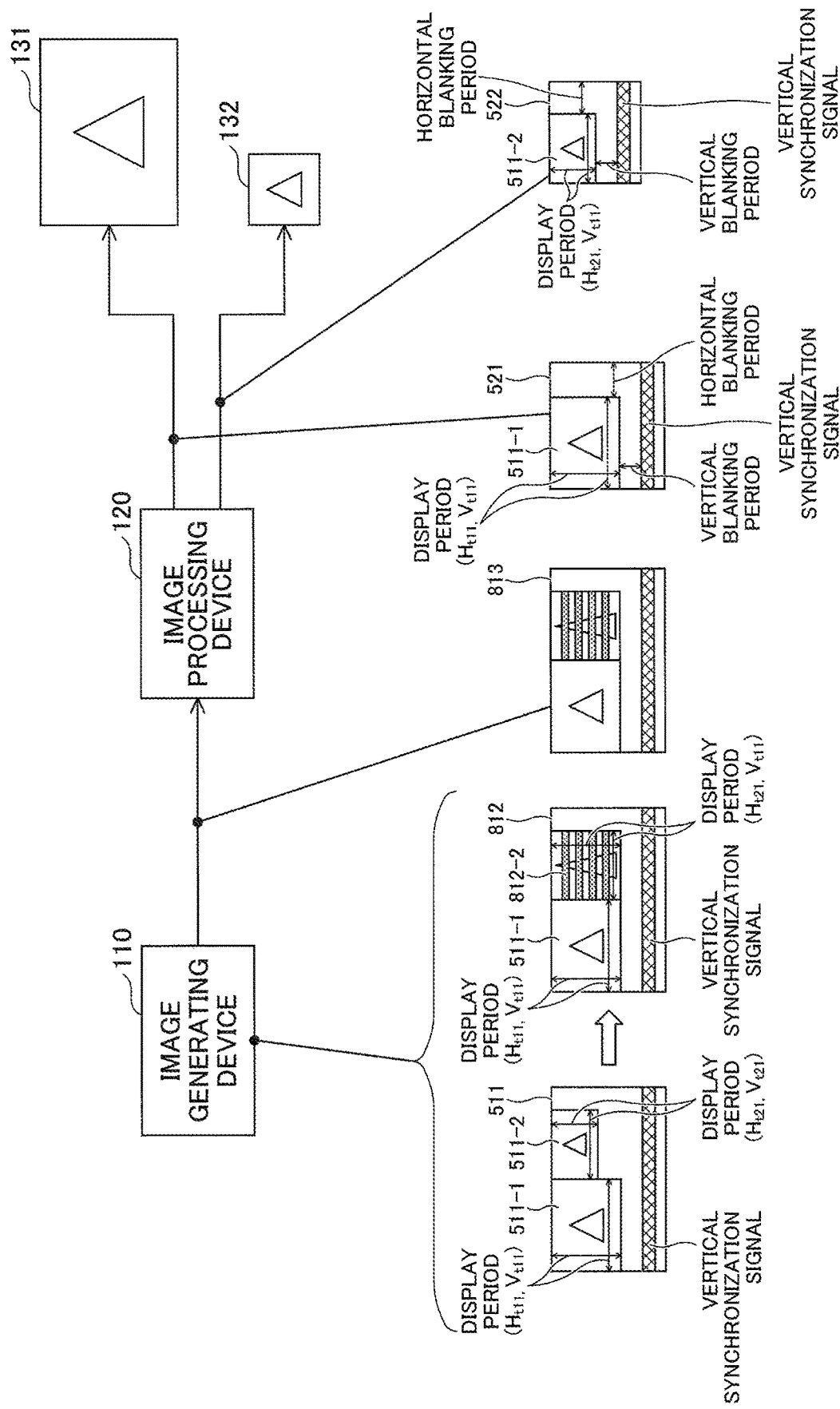
FIG. 8 is a drawing illustrating details of processes performed by devices in an image display system according to a second embodiment.

First, details of processes performed by devices in an image display system 140 of the second embodiment are described. FIG. 8 is a drawing illustrating details of processes performed by devices in the image display system of the second embodiment.

The image generating device 110 generates image data 511 by combining, in the horizontal direction, an effective display area 511-1 of first image data for the first display 131 having a resolution of 1920 pixels×1080 pixels and an effective display area 511-2 of second image data for the second display 132 having a resolution of 1280 pixels×720 pixels. The effective display area 511-1 is 1920 pixels×1080 pixels, and the effective display area 511-2 is 1280 pixels×720 pixels.

Also, the image generating device 110 calculates a difference between the vertical size of the effective display area 511-1 of the first image data for the first display 131 and the vertical size of the effective display area 511-2 of the second image data for the second display 132.

Further, the image generating device 110 expands the effective display area 511-2 of the second image data for the second display 132 by inserting multiple dummy lines based on the calculated difference and thereby obtains an effective display area 812-2. For example, the image generating device 110 inserts dummy lines by copying adjacent lines.

Next, the image generating device 110 generates image data 812 by combining the effective display area 511-1 of the first image data for the first display 131 and the effective display area 812-2 of the second image data for the second display 132 in the horizontal direction.

Next, the image generating device 110 outputs the generated image data 812 as input image data 813 to the image processing device 120. As a result, the image processing device 120 obtains the input image data 813.

The image processing device 120 generates first output image data 521 and second output image data 522 by dividing the input image data 813 in the horizontal direction.

In the first output image data 521, a horizontal blanking period and a horizontal synchronization signal are set according to the resolution of the first display 131. Here, because the image processing device 120 does not include frame buffers, the first output image data 521 is synchronized such that its vertical frequency becomes equal to the vertical frequency of the input image data 813. Therefore, the vertical blanking period of the first output image data 521 is set based on the vertical blanking period of the input image data 813, and the corresponding vertical synchronization signal is set. The vertical blanking period of the first output image data 521 is preferably the same as the vertical blanking period of the input image data 813. However, a difference of, for example, several lines is acceptable as long as it is not noticeable on the display screen.

Accordingly, the effective display area 511-1 is displayed on the first display 131 at the same frame rate as the input image data 813.

On the other hand, in generating the second output image data 522, the image processing device 120 reduces the size of the effective display area 812-2 included in the input image data 813 in the vertical direction by removing the dummy lines through a thinning process, and thereby generates the effective display area 511-2. Here, when the vertical size of the effective display area 812-2 after the division is reduced in the vertical direction, the number of lines output in the same period in the vertical direction is reduced.

Although the effective display area 511-1 of the first output image data 521 and the effective display area 511-2 of the second output image data 522 have different vertical sizes, their vertical frequencies can be made equal to each other by adjusting the pixel clock for the second output image data 522.

Therefore, when the vertical blanking period is set in the second output image data 522 such that its vertical frequency becomes equal to the vertical frequency of the input image data 813, the vertical blanking period can be made shorter than the vertical blanking period set in the second output image data 422 illustrated in FIG. 4.

As a result, the image processing device 120 can display the effective display area 511-2 on the second display 132 at the same frame rate as the input image data 813.

As illustrated in FIG. 8, when comparing the image data 812 and the first output image data 521,
  in the horizontal direction, the display period of the effective display area 511-1 remains unchanged at $H_{t11}$; and
  in the vertical direction, the display period of the effective display area 511-1 remains unchanged at $V_{t11}$.

Also, as illustrated in FIG. 8, when comparing the display period of the effective display area 812-2 of the image data 812 and the display period of the effective display area 511-2 of the second output image data 522,
  in the horizontal direction, the display period remains unchanged at $H_{t21}$; and
  in the vertical direction, the display period remains unchanged at $V_{t11}$.

(2) Functional Configuration of Image Processor

Figure 9:
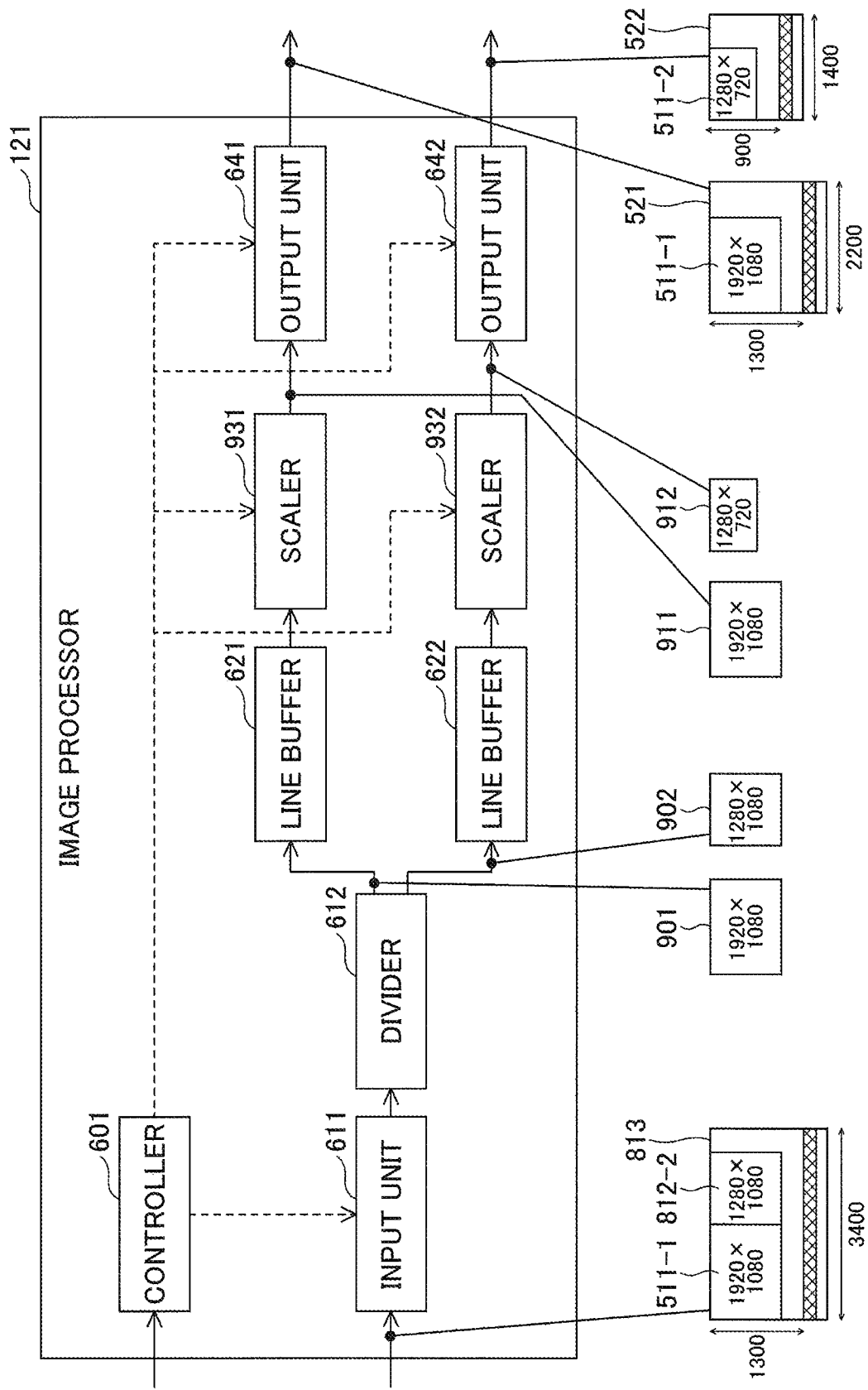
FIG. 9 is a drawing illustrating an example of a functional configuration of an image processor of an image processing device according to the second embodiment.

Next, the functional configuration of the image processor 121 is described. FIG. 9 is a drawing illustrating an example of a functional configuration of the image processor of the image processing device according to the second embodiment. The functional configuration illustrated in FIG. 9 differs from the functional configuration illustrated in FIG. 6 in scalers 931 and 932.

The scalers 931 and 932, respectively, read first intermediate image data 901 and second intermediate image data 902 stored in the line buffers 621 and 622 line by line and perform a thinning process.

In the second embodiment, when generating the input image data 813, the image generating device 110 does not insert dummy lines into the effective display area 511-1. Therefore, the scaler 931 outputs the first intermediate image data 901 read line by line from the line buffer 621 to the output unit 641 as first intermediate image data 911 without reducing its size by the thinning process.

As a result, the first display 131 can display the effective display area 511-1 suitable for its resolution (for example, 1920 pixels×1080 pixels) at the same frame rate as the input image data 813.

On the other hand, in the second embodiment, when generating the input image data 813, the image generating device 110 expands the effective display area 511-2 by inserting dummy lines into the effective display area 511-2 and thereby obtains the effective display area 812-2.

Therefore, the scaler 932 performs a thinning process on the second intermediate image data 902 read line by line from the line buffer 622 to remove the dummy lines and reduce its vertical size and thereby generates second intermediate image data 912.

As a result, the second display 132 can display the effective display area 511-2 suitable for its resolution (for example, 1280 pixels×720 pixels) at the same frame rate as the input image data 813.

Here, the scaler 932 performs the thinning process to reduce the size of the second intermediate image data 902 by an amount expanded by the image generating device 110 in the vertical direction by inserting the dummy lines, and outputs the resulting image data as the second intermediate image data 912 to the output unit 642. Thus, the scaler 932 can reproduce image data equivalent to the second image data for the second display 132 initially generated by the image generating device 110.

(3) Image Processing Performed by Image Processing Device

Figure 10:
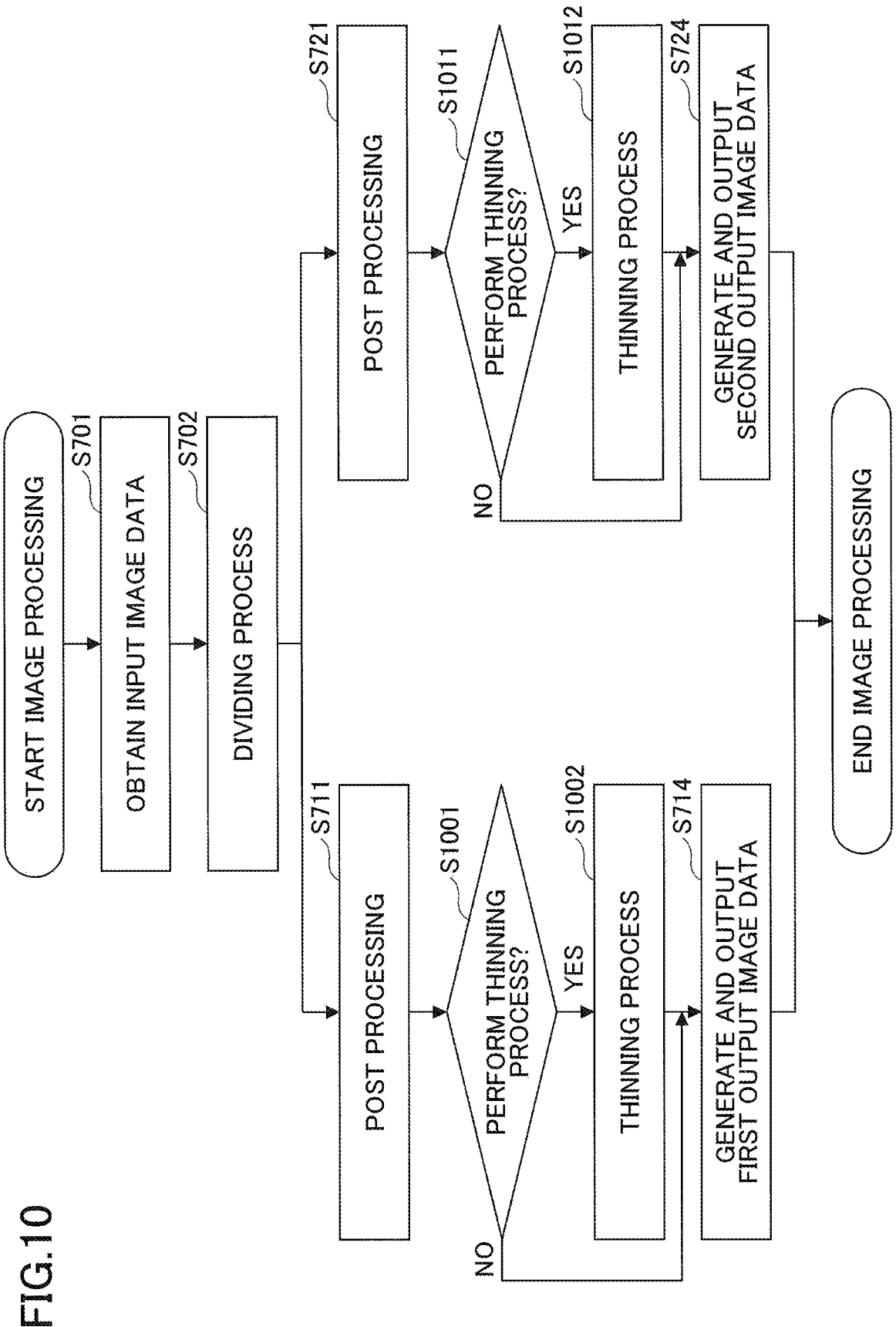
FIG. 10 is a flowchart illustrating image processing performed by the image processor of the image processing device according to the second embodiment.

Next, image processing performed by the image processor 121 of the image processing device 120 is described. FIG. 10 is a flowchart illustrating image processing performed by the image processor of the image processing device according to the second embodiment. FIG. 10 differs from FIG. 7 in steps S1001, S1002, S1011, and S1012.

At step S1001, the scaler 931 determines whether to perform a thinning process based on the setting data reported from the controller 601. When it is determined at step S1001 that the thinning process is not performed (NO at step S1001), the process proceeds to step S714.

On the other hand, when it is determined at step S1001 that the thinning process is performed (YES at step S1001), the process proceeds to step S1002. At step S1002, the scaler 931 performs the thinning process on the first intermediate image data 901.

Similarly, at step S1011, the scaler 932 determines whether to perform a thinning process based on the setting data reported from the controller 601. When it is determined at step S1011 that the thinning process is not performed (NO at step S1011), the process proceeds to step S724.

On the other hand, when it is determined at step S1011 that the thinning process is performed (YES at step S1011), the process proceeds to step S1012. At step S1012, the scaler 932 performs the thinning process on the second intermediate image data 902.

SUMMARY

As is clear from the above descriptions, the following processes are performed in the image display system of the second embodiment.

The image generating device generates an effective display area (1920 pixels×1080 pixels) of first image data for a first display. Also, the image generating device generates an effective display area (1280 pixels×1080 pixels) by inserting dummy lines into an effective display area (1280 pixels×720 pixels) of second image data for a second display and thereby expanding its size in the vertical direction. Further, the image generating device generates input image data by combining the generated effective display area (1920 pixels×1080 pixels) and the generated effective display area (1280 pixels×1080 pixels) in the horizontal direction, and outputs the input image data to the image processing device.

The image processing device obtains the input image data output from the image generating device.

The image processing device generates first intermediate image data and second intermediate image data by dividing the obtained input image data in the horizontal direction. Also, the image processing device performs a thinning process on the second intermediate image data to reduce the vertical size of the second intermediate image data and thereby generate second output image data.

With this configuration, the image display system of the second embodiment can output the second output image data at a horizontal frequency lower than that of the input image data even when line buffers are used instead of frame buffers. This in turn makes it possible to reduce the vertical blanking period in the second output image data having the same vertical frequency as the input image data.

That is, the image display system of the second embodiment can reduce the blanking period when displaying sets of intermediate image data, which are obtained by dividing input image data and have different sizes, at the same frame rate. This in turn makes it possible to display sets of output image data at the same frame rate as input image data without including a non-display area.

Third Embodiment

In the first embodiment, the scaler performs a filtering process to reduce the number of lines of an effective display area; and in the second embodiment, the scaler performs a thinning process to reduce the number of lines of an effective display area.

On the other hand, in a third embodiment, the scaler shifts the wrapping position of each line to change the aspect ratio and thereby reduce the number of lines of an effective display area. Below, differences between the third embodiment and the first and second embodiments are mainly described.

<Details of Processes Performed by Devices in Image Display System of Third Embodiment>

(1) Details of Processes Performed by Devices

Figure 11:
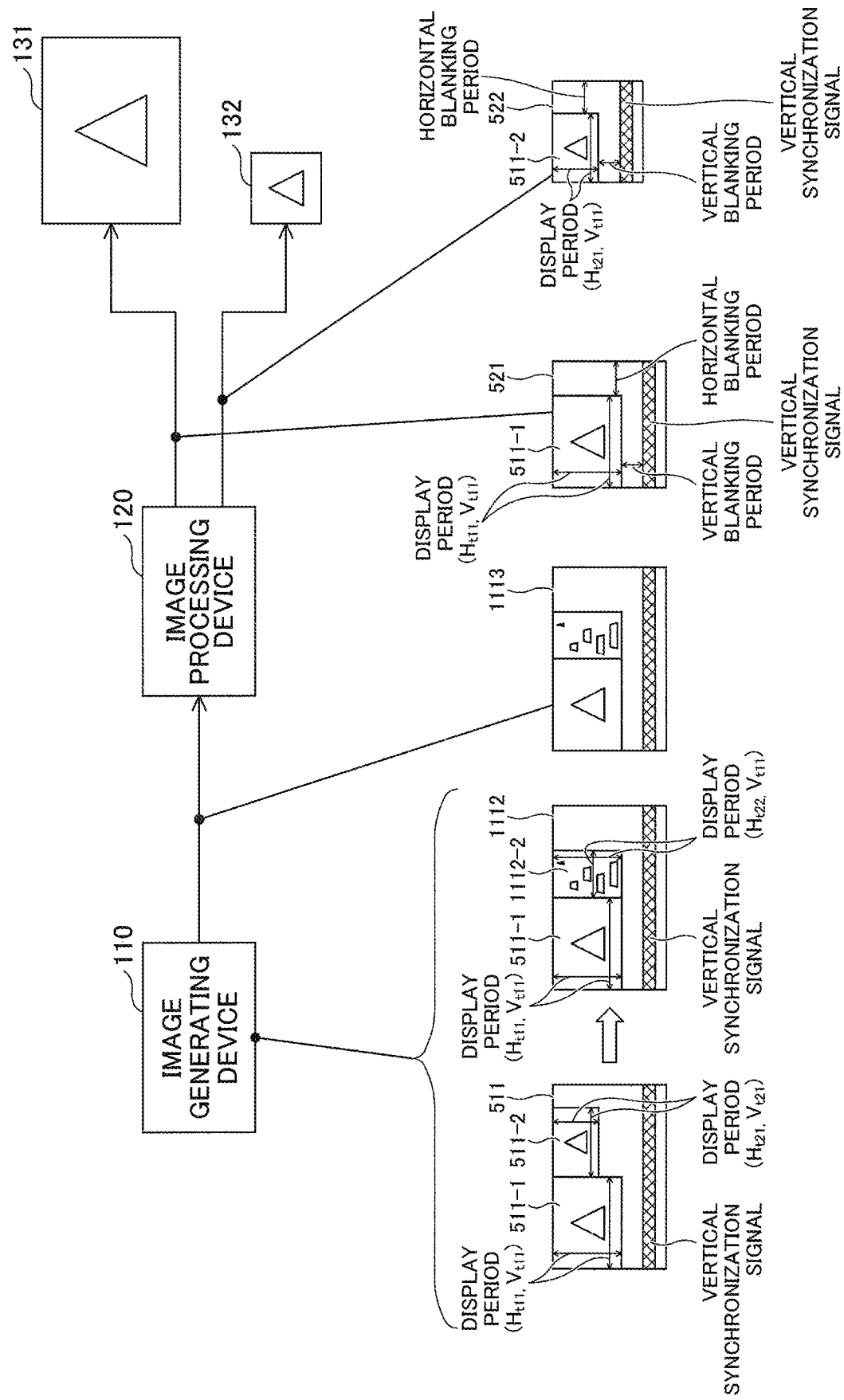
FIG. 11 is a drawing illustrating details of processes performed by devices in an image display system according to a third embodiment.

First, details of processes performed by devices in an image display system 140 of the third embodiment are described. FIG. 11 is a drawing illustrating details of processes performed by devices in the image display system of the third embodiment.

The image generating device 110 generates image data 511 by combining, in the horizontal direction, an effective display area 511-1 of first image data for the first display 131 having a resolution of 1920 pixels×1080 pixels and an effective display area 511-2 of second image data for the second display 132 having a resolution of 1280 pixels×720 pixels. The effective display area 511-1 is 1920 pixels×1080 pixels, and the effective display area 511-2 is 1280 pixels×720 pixels.

Also, the image generating device 110 calculates the ratio of the vertical size of the effective display area 511-1 of the first image data for the first display 131 to the vertical size of the effective display area 511-2 of the second image data for the second display 132.

Further, the image generating device 110 expands the effective display area 511-2 of the second image data for the second display 132 in the vertical direction by shifting wrapping position of each line of the effective display area 511-2 based on the calculated ratio. As a result, the image generating device 110 obtains an effective display area 1112-2.

Next, the image generating device 110 generates image data 1112 by combining the effective display area 511-1 of the first image data for the first display 131 and the effective display area 1112-2 of the second image data for the second display 132 in the horizontal direction.

Next, the image generating device 110 outputs the generated image data 1112 as input image data 1113 to the image processing device 120. As a result, the image processing device 120 obtains the input image data 1113.

The image processing device 120 generates the first output image data 521 and the second output image data 522 by dividing the input image data 1113 in the horizontal direction.

In the first output image data 521, a horizontal blanking period and a horizontal synchronization signal are set according to the resolution of the first display 131. Here, because the image processing device 120 does not include frame buffers, the first output image data 521 is synchronized such that its vertical frequency becomes equal to the vertical frequency of the input image data 1113. Therefore, the vertical blanking period of the first output image data 521 is set based on the vertical blanking period of the input image data 1113, and the corresponding vertical synchronization signal is set. The vertical blanking period of the first output image data 521 is preferably the same as the vertical blanking period of the input image data 1113. However, a difference of, for example, several lines is acceptable as long as it is not noticeable on the display screen.

Accordingly, the effective display area 511-1 is displayed on the first display 131 at the same frame rate as the input image data 1113.

On the other hand, when generating the second output image data 522, the image processing device 120 reduces the vertical size of the effective display area 1112-2 included in the input image data 1113 by restoring the wrapping position of each line to its original position and thereby generates the effective display area 511-2. Here, when the vertical size of the effective display area 1112-2 after the division is reduced in the vertical direction, the number of lines output in the same period in the vertical direction is reduced.

Although the effective display area 511-1 of the first output image data 521 and the effective display area 511-2 of the second output image data 522 have different vertical sizes, their vertical frequencies can be made equal to each other by adjusting the pixel clock for the second output image data 522.

Therefore, when the vertical blanking period is set in the second output image data 522 such that its vertical frequency becomes equal to the vertical frequency of the input image data 1113, the vertical blanking period can be made shorter than the vertical blanking period set in the second output image data 422 illustrated in FIG. 4.

As a result, the image processing device 120 can display the effective display area 511-2 on the second display 132 at the same frame rate as the input image data 1113.

As illustrated in FIG. 11, when comparing the image data 1112 and the first output image data 521,
  in the horizontal direction, the display period of the effective display area 511-1 remains unchanged at $H_{t11}$; and
  in the vertical direction, the display period of the effective display area 511-1 remains unchanged at $V_{t11}$.

Also, as illustrated in FIG. 11, when comparing the display period of the effective display area 1112-2 of the image data 1112 and the display period of the effective display area 511-2 of the second output image data 522,
  in the horizontal direction, the display period changes from $H_{t22}$ to $H_{t21}$ as a result of restoring the wrapping position to the original position; and
  in the vertical direction, the display period remains unchanged at $V_{t11}$.

(2) Functional Configuration of Image Processor

Figure 12:
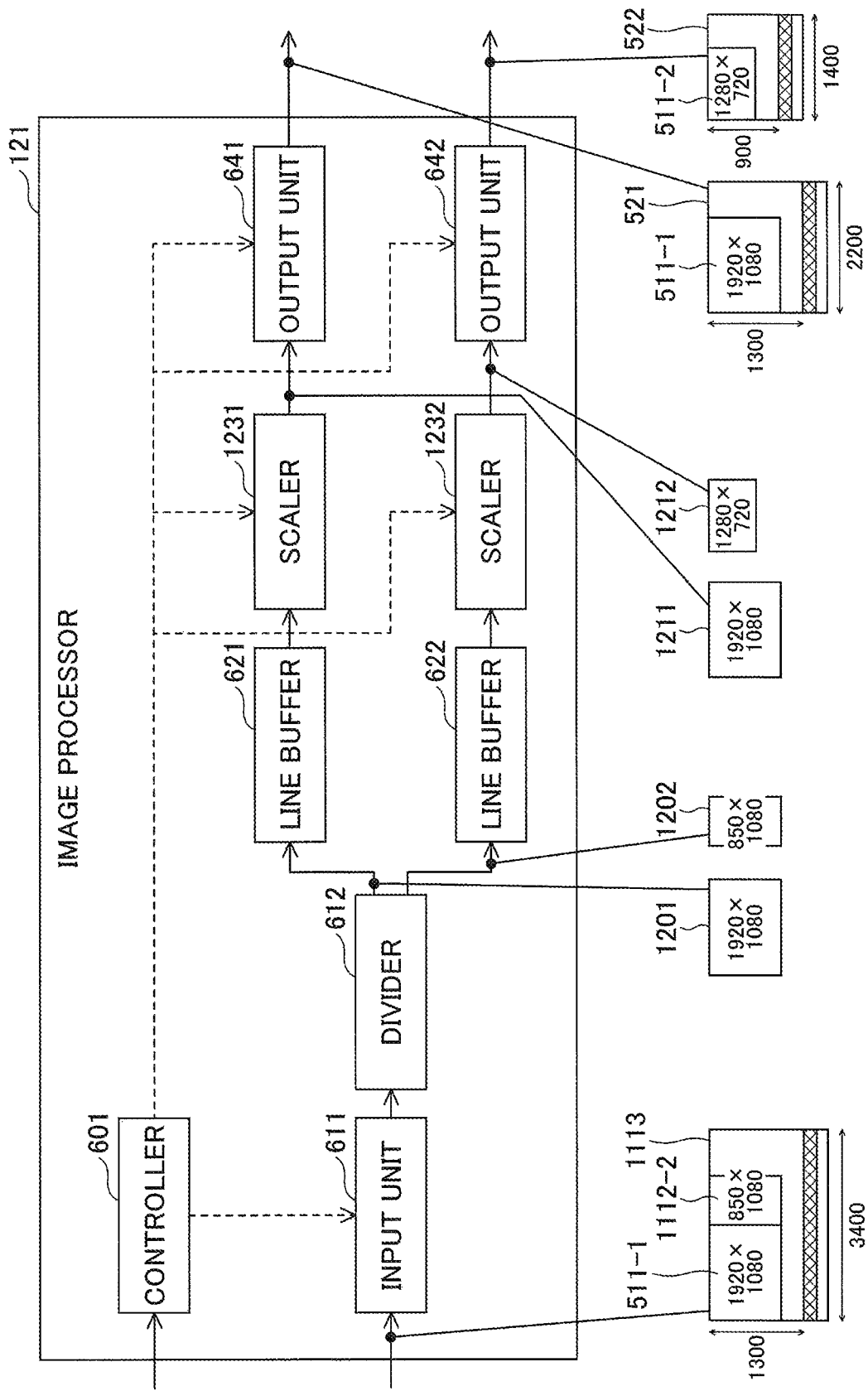
FIG. 12 is a drawing illustrating an example of a functional configuration of an image processor of an image processing device according to the third embodiment.

Next, a functional configuration of the image processor 121 is described. FIG. 12 is a drawing illustrating an example of a functional configuration of the image processor of the image processing device according to the third embodiment. The functional configuration illustrated in FIG. 12 differs from the functional configuration illustrated in FIG. 6 in scalers 1231 and 1232.

The scalers 1231 and 1232, respectively, read first intermediate image data 1201 and second intermediate image data 1202 stored in the line buffers 621 and 622 line by line and perform a process to restore the wrapping position of each line to the original position.

In the third embodiment, the image generating device 110 does not shift the wrapping position of each line of the effective display area 511-1 when generating the input image data 1113. Therefore, the scaler 1231 outputs the first intermediate image data 1201 read line by line from the line buffer 621 to the output unit 641 as first intermediate image data 1211 without reducing the size of the first intermediate image data 1201 by a wrapping position restoring process.

Accordingly, the first display 131 can display the effective display area 511-1 suitable for its resolution (for example, 1920 pixels×1080 pixels) at the same frame rate as the input image data 1113.

On the other hand, in the third embodiment, when generating the input image data 1113, the image generating device 110 expands the effective display area 511-2 by shifting the wrapping position of each line of the effective display area 511-2 to obtain the effective display area 1112-2.

For this reason, the scaler 1232 reduces the vertical size of the second intermediate image data 1202 read line by line from the line buffer 622 by performing a wrapping position restoring process and thereby generates second intermediate image data 1212.

As a result, the second display 132 can display the effective display area 511-2 suitable for its resolution (for example, 1280 pixels×720 pixels) at the same frame rate as the input image data 1113 without including a non-display area.

Here, the scaler 1232 restores the wrapping position to the original position to reduce the size of the second intermediate image data 1202 by an amount expanded by the image generating device 110 in the vertical direction by shifting the wrapping position, and outputs the resulting image as the second intermediate image data 1212 to the output unit 642. Thus, the scaler 1232 can reproduce image data equivalent to the second image data for the second display 132 initially generated by the image generating device 110.

(3) Image Processing Performed by Image Processing Device

Figure 13:
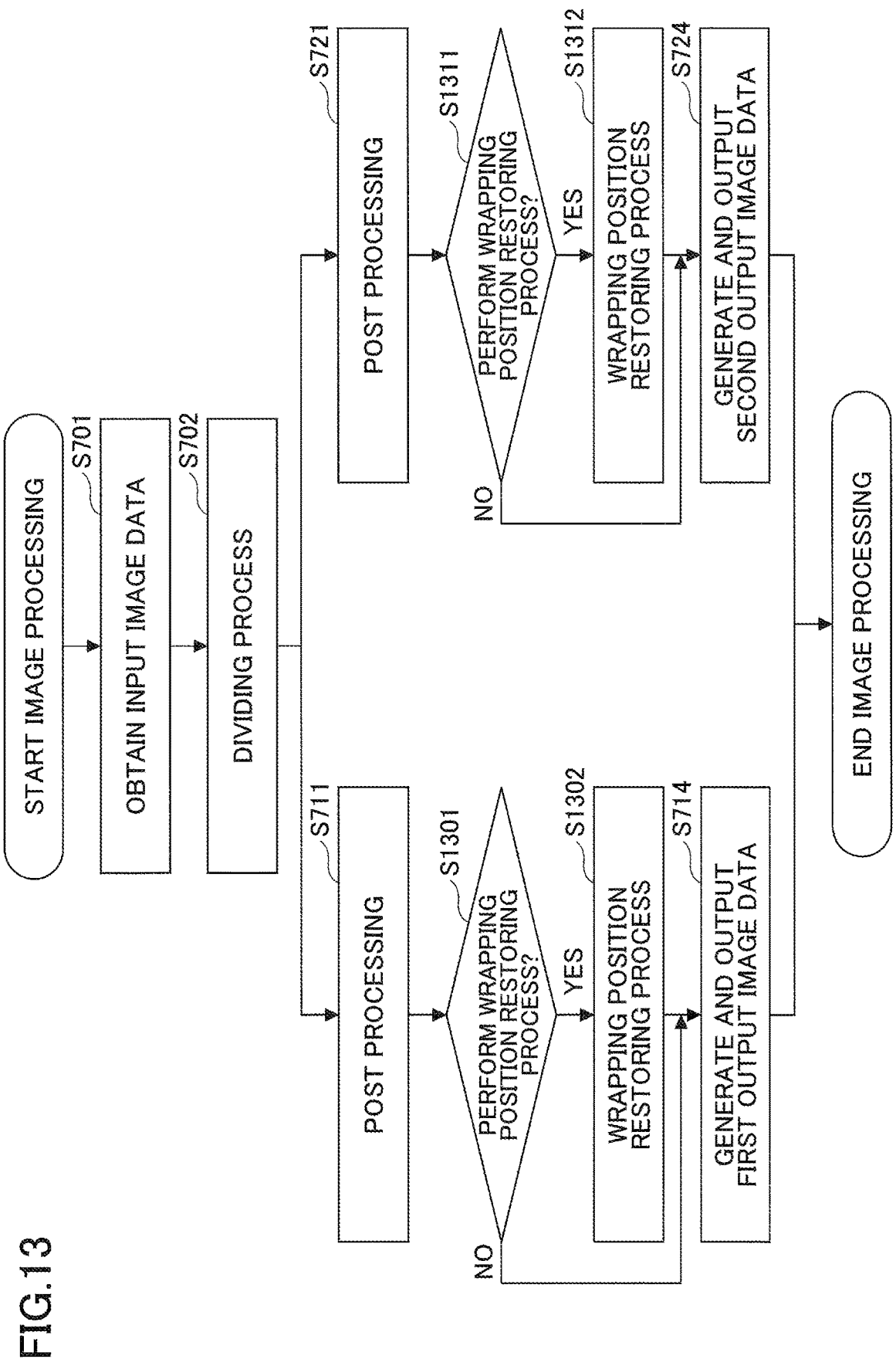
FIG. 13 is a flowchart illustrating image processing performed by the image processor of the image processing device according to the third embodiment.

Next, image processing performed by the image processor 121 of the image processing device 120 is described. FIG. 13 is a flowchart illustrating image processing performed by the image processor of the image processing device according to the third embodiment. FIG. 13 differs from FIG. 7 in steps S1301, S1302, S1311, and S1312.

At step S1301, the scaler 1231 determines whether to perform a wrapping position restoring process based on the setting data reported from the controller 601. When it is determined at step S1301 that the wrapping position restoring process is not performed (NO at step S1301), the process proceeds to step S714.

On the other hand, when it is determined at step S1301 that the wrapping position restoring process is performed (YES at step S1301), the process proceeds to step S1302. At step S1302, the scaler 1231 performs the wrapping position restoring process on the first intermediate image data 1201.

Similarly, at step S1311, the scaler 1232 determines whether to perform a wrapping position restoring process based on the setting data reported from the controller 601. When it is determined at step S1311 that the wrapping position restoring process is not performed (NO at step S1311), the process proceeds to step S724.

On the other hand, when it is determined at step S1311 that the wrapping position restoring process is performed (YES at step S1311), the process proceeds to step S1312. At step S1312, the scaler 1232 performs the wrapping position restoring process on the second intermediate image data 1202.

SUMMARY

As is clear from the above descriptions, the following processes are performed in the image display system of the third embodiment.

The image generating device generates an effective display area (1920 pixels×1080 pixels) of first image data for a first display. Also, the image generating device generates an effective display area (850 pixels×1080 pixels) by shifting the wrapping position of each line of an effective display area (1280 pixels×720 pixels) of second image data for a second display and thereby expanding its size in the vertical direction. Further, the image generating device generates input image data by combining the generated effective display area (1920 pixels×1080 pixels) and the generated effective display area (850 pixels×1080 pixels) in the horizontal direction, and outputs the input image data to the image processing device.

The image processing device obtains the input image data output from the image generating device.

The image processing device generates first intermediate image data and second intermediate image data by dividing the obtained input image data in the horizontal direction. Also, the image processing device performs a wrapping position restoring process on the second intermediate image data to reduce the size of the second intermediate image data and thereby generate second output image data.

With this configuration, the image display system of the third embodiment can output the second output image data at a horizontal frequency lower than that of the input image data even when line buffers are used instead of frame buffers. This in turn makes it possible to reduce the vertical blanking period in the second output image data having the same vertical frequency as the input image data.

That is, the image display system of the third embodiment can reduce the blanking period when displaying sets of intermediate image data, which are obtained by dividing input image data and have different sizes, at the same frame rate. This in turn makes it possible to display sets of output image data at the same frame rate as input image data without including a non-display area.

Other Embodiments

In the first through third embodiments described above, each of two scalers includes a function for processing first intermediate image data or second intermediate image data and in image processing, the second intermediate image data is processed.

However, the first intermediate image data may be processed instead of the second intermediate image data. Further, both of the first intermediate image data and the second intermediate image data may be processed.

Also, in the first through third embodiments, one of the first output image data and the second output image data is output to each of two displays. However, the number of displays is not limited to two, and the image display system may be configured such that one of first through Nth sets of output image data is output to each of N displays (N is an integer greater than or equal to three).

In the first through third embodiments, it is assumed that the resolution of the first display 131 is 1920 pixels×1080 pixels and the resolution of the second display 132 is 1280 pixels×720 pixels. However, the resolution of the first display 131 and the resolution of the second display 132 are not limited to these examples. In the first through third embodiments, the resolution of the first display 131 is higher than the resolution of the second display 132. However, the resolution of the second display 132 may be higher than the resolution of the first display 131. In this case, the scaler 631/931/1231 performs a filtering process, a thinning process, or a wrapping position restoring process on the first intermediate image data 651/901/1201.

In the first through third embodiments, the image generating device 110 calculates a ratio or a difference and then expands the effective display area of the second image data in the vertical direction. However, the image generating device 110 may be configured to read a pre-calculated ratio or difference and expand the effective display area of the second image data in the vertical direction.

Further, in the first through third embodiments, it is assumed that the image display system 140 is installed in the vehicle 100. However, the image display system 140 may be used for other applications.

An image processing device, an image processing method, and an image display system according to embodiments of the present invention are described above. However, the present invention is not limited to the above-described embodiments, and modifications may be made without departing from the scope of the present invention. For example, the above-described configurations may be combined with other elements depending on the applications of the present invention.

What is claimed is:

1. An image processing device, comprising:
    a memory configured to store a program; and
    a processor configured to execute the program stored in the memory to perform a process including
        obtaining input image data that is generated by combining, in a horizontal direction, an effective display area of first image data and an expanded effective display area obtained by expanding an effective display area of second image data in a vertical direction so that a vertical size of the expanded effective display area is the same as a vertical size of the effective display area of the first image data, a vertical size of the second image data being smaller than a vertical size of the first image data, and
        generating second output image data corresponding to the second image data by reducing a vertical size of second intermediate image data among first intermediate image data and the second intermediate image data, which are obtained by dividing the input image data in the horizontal direction, based on a vertical size of the effective display area of the second image data.

2. The image processing device as claimed in claim 1, further comprising:
    a line buffer configured to store the second intermediate image data in units of multiple lines,
    wherein in the generating, the second intermediate image data is read from the line buffer and the vertical size of the second intermediate image data is reduced.

3. The image processing device as claimed in claim 2, wherein the vertical size of the second intermediate image data is reduced by a filtering process.

4. The image processing device as claimed in claim 3, wherein the input image data is generated by combining, in the horizontal direction, the effective display area of the first image data and the effective display area obtained by expanding the vertical size of the effective display area of the second image data by the filtering process.

5. The image processing device as claimed in claim 2, wherein the vertical size of the second intermediate image data is reduced by a thinning process.

6. The image processing device as claimed in claim 5, wherein the input image data is generated by combining, in the horizontal direction, the effective display area of the first image data and the effective display area obtained by expanding the vertical size of the effective display area of the second image data by inserting dummy lines.

7. The image processing device as claimed in claim 2, wherein the vertical size of the second intermediate image data is reduced by shifting a wrapping position of each line.

8. The image processing device as claimed in claim 7, wherein the input image data is generated by combining, in the horizontal direction, the effective display area of the first image data and the effective display area obtained by expanding the vertical size of the effective display area of the second image data by shifting the wrapping position of each line.

9. The image processing device as claimed in claim 1, wherein the process further includes dividing the input image data in the horizontal direction.

10. The image processing device as claimed in claim 9, wherein
the process further includes identifying a horizontal size based on setting data for the input image data; and
in the dividing, the input image data is divided in the horizontal direction based on the identified horizontal size.

11. The image processing device as claimed in claim 9, further comprising:
a storage configured to store a horizontal size according to which the input image data is divided in the horizontal direction,
wherein in the dividing, the input image data is divided in the horizontal direction based on the horizontal size stored in the storage.

12. The image processing device as claimed in claim 1, wherein
the process further includes generating first output image data corresponding to the first image data based on the first intermediate image data.

13. An image processing method, comprising:
obtaining input image data that is generated by combining, in a horizontal direction, an effective display area of first image data and an expanded effective display area obtained by expanding an effective display area of second image data in a vertical direction so that a vertical size of the expanded effective display area is the same as a vertical size of the effective display area of the first image data, a vertical size of the second image data being smaller than a vertical size of the first image data; and
generating, by a processor, second output image data corresponding to the second image data by reducing a vertical size of second intermediate image data among first intermediate image data and the second intermediate image data, which are obtained by dividing the input image data in the horizontal direction, based on a vertical size of the effective display area of the second image data.

14. The image processing method as claimed in claim 13, wherein the vertical size of the second intermediate image data is reduced by a filtering process.

15. The image processing method as claimed in claim 13, wherein the vertical size of the second intermediate image data is reduced by a thinning process.

16. The image processing method as claimed in claim 13, wherein the vertical size of the second intermediate image data is reduced by shifting a wrapping position of each line.

17. The image processing method as claimed in claim 13, further comprising:
generating first output image data corresponding to the first image data based on the first intermediate image data.

18. An image display system, comprising:
an image generating device configured to generate input image data by combining, in a horizontal direction, an effective display area of first image data and an expanded effective display area obtained by expanding an effective display area of second image data in a vertical direction so that a vertical size of the expanded effective display area is the same as a vertical size of the effective display area of the first image data, a vertical size of the second image data being smaller than a vertical size of the first image data; and
an image processing device configured to generate second output image data corresponding to the second image data by reducing a vertical size of second intermediate image data among first intermediate image data and the second intermediate image data, which are obtained by dividing the input image data in the horizontal direction, based on a vertical size of the effective display area of the second image data.

19. The image display system as claimed in claim 18, wherein
the image processing device is configured to generate first output image data corresponding to the first image data based on the first intermediate image data, and
the image display system further includes:
a first display device configured to display the first output image data, and
a second display device configured to display the second output image data.

* * * * *